(12) United States Patent
Hoffmann

(10) Patent No.: US 10,009,264 B2
(45) Date of Patent: Jun. 26, 2018

(54) HANDLING OF SIGNALING MESSAGES ON THE DATA PLANE IN A SOFTWARE-DEFINED ARCHITECTURE

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 0 days. days.

(21) Appl. No.: 15/023,020

(22) PCT Filed: Sep. 20, 2013

(86) PCT No.: PCT/EP2013/069585
§ 371 (c)(1),
(2) Date: Mar. 18, 2016

(87) PCT Pub. No.: WO2015/039699
PCT Pub. Date: Mar. 26, 2015

(65) Prior Publication Data
US 2016/0234104 A1 Aug. 11, 2016

(51) Int. Cl.
*H04L 12/28* (2006.01)
*H04L 12/721* (2013.01)
(Continued)

(52) U.S. Cl.
CPC .......... *H04L 45/38* (2013.01); *H04L 12/4633* (2013.01); *H04L 41/0213* (2013.01);
(Continued)

(58) Field of Classification Search
CPC ............. H04L 12/4633; H04L 41/0206; H04L 41/0213; H04L 41/0806; H04L 43/026;
(Continued)

(56) References Cited

U.S. PATENT DOCUMENTS

| 2011/0286324 A1 | 11/2011 | Bellagamba et al. |
| 2013/0176850 A1 | 7/2013 | Mishra et al. |
| 2014/0064246 A1* | 3/2014 | Baillargeon ........ H04L 61/2592 370/331 |

FOREIGN PATENT DOCUMENTS

| WO | WO 2012/160465 A1 | 11/2012 |
| WO | WO 2012/177213 A2 | 12/2012 |
| WO | WO 2015/000516 A1 | 1/2015 |

OTHER PUBLICATIONS

International Preliminary Report on Patentability dated Dec. 1, 2015 corresponding to International Patent Application No. PCT/EP2013/069585.

(Continued)

*Primary Examiner* — Kan Yuen
(74) *Attorney, Agent, or Firm* — Squire Patton Boggs (US) LLP

(57) ABSTRACT

There are provided measures for handling a signaling message on a data plane in a software-defined architecture. Such measures may exemplarily comprise establishing, in a control plane entity, an instruction for reacting to a specific incoming signaling message on the data plane with a corresponding outgoing message on the data plane, providing the established instruction from the control plane entity to a data plane entity for instructing the data plane entity to react to the specific incoming signaling message with the corresponding outgoing message in accordance with the established instruction, and reacting, in the data plane entity, upon detection of the specific incoming signaling message on the data plane, to the specific incoming signaling message on the data plane in accordance with the provided instruction.

19 Claims, 7 Drawing Sheets

(51) Int. Cl.
  *H04L 12/24* (2006.01)
  *H04L 12/46* (2006.01)
  *H04L 12/741* (2013.01)
  *H04L 29/08* (2006.01)
  *H04L 12/26* (2006.01)

(52) U.S. Cl.
  CPC ........ *H04L 41/0806* (2013.01); *H04L 45/745* (2013.01); *H04L 67/34* (2013.01); *H04L 41/0206* (2013.01); *H04L 43/026* (2013.01); *H04L 43/10* (2013.01)

(58) Field of Classification Search
  CPC ....... H04L 43/10; H04L 45/38; H04L 45/745; H04L 67/34
  See application file for complete search history.

(56) References Cited

OTHER PUBLICATIONS

Written Opinion of the International Preliminary Examining Authority dated Sep. 2, 2015 corresponding to International Patent Application No. PCT/EP2013/069585.

International Search Report and Written Opinion dated Jan. 23, 2014 corresponding to International Patent Application No. PCT/EP2013/069585.

Sami Boutros et al., "Performance Monitoring of MPLS Transport Profile LSP draft-boutros-mpls-tp-performance-01.txt," Performance Monitoring of MPLS Transport Profile LST; Internet Engineering Task Force, IETF; Standard Working Draft, No. 1, Mar. 9, 2009, XP015060460, pp. 1-16.

Christian E. Rothenberg et al., "Revisiting Routing Control Platforms with the Eyes and Muscles of Software-Defined Networking," Hot Topics in Software Defined Networks, ACM, Aug. 13, 2012, pp. 13-18, XP058008057.

Haoyu Song, "Protocol-Oblivious Forwarding: Unleash the Power of SDN through a Future-Proof Forwarding Plane," HotSDN '13 Proceedings of the second ACM SIGCOMM workshop; pp. 127-132, New York, USA, 2013.

M. Bocci et al., "MPLS Generic Associated Channel," Network Working Group, RFC 5586, Jun. 2009, pp. 1-19.

D. Katz et al., "Bidirectional Forwarding Detection (BFD)," Internet Engineering Task Force (IETF), RFC 5880, Jun. 2010, pp. 1-49.

D. Katz et al., "Bidirectional Forwarding Detection (BED) for IPv4 and IPv6 (Single Hop)," Internet Engineering Task Force (IETF), RFC 5881, Jun. 2010, pp. 1-7.

3GPP TS 23.401 V12.1.0 (Jun. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2013, 291 pages.

3GPP TS 29.281 V10.3.0 (Sep. 2011), Technical Specification, 3rd Generation Partnership Project; Technical Specification Group Core Network and Terminals; General Packet Radio System (GPRS) Tunnelling Protocol User Plane (GTPv1-U) (Release 10), Sep. 2011, 25 pages.

3GPP TS 29.281 V11.6.0 (Mar. 2013), Technical Specification, 3rd Generation Partnership Project; Technical Specification Group Core Network and Terminals; General Packet Radio System (GPRS) Tunnelling Protocol User Plane (GTPv1-U) (Release 11), Mar. 2013, 27 pages.

* cited by examiner

HANDLING OF SIGNALING MESSAGES ON THE DATA PLANE IN A SOFTWARE-DEFINED ARCHITECTURE

FIELD

The present invention relates to the handling of a signaling message on data plane in a software-defined architecture. More specifically, the present invention relates to measures (including methods, apparatuses and computer program products) for enabling the handling of a signaling message on a data plane in a software-defined architecture.

BACKGROUND

Mobile and fixed data transmission and data services are constantly making progress, wherein such services provide various communication services, such as voice, video, packet data, messaging, broadcast, etc. In recent years, LTE and LTE-A have been specified, which use the Evolved Universal Terrestrial Radio Access Network (E-UTRAN) as radio communication architecture according to 3GPP specifications.

Furthermore, network virtualization is used in recent technologies, which splits conventional networks and their network elements into subsets to be used, operated and managed by different organizationally independent organizations. The use of network virtualization offers flexibility in the development of future network architectures.

In the context of network virtualization, the migration of network elements in combination with software defined networking (SDN) is capable of transforming today's networks into a fully software-defined infrastructure that is both highly efficient and flexible. Similarly, a fully software-defined infrastructure can also be achieved by the migration of network elements in combination with network functions virtualisation (NFV). Accordingly, a software defined networking (SDN) architecture and/or a network functions virtualisation (NFV) architecture is about to be adopted in mobile and/or fixed communication systems.

Within the development of software-defined infrastructures for/in networking, a separation of the control plane and the data plane (which may equally be referred to as user plane, forwarding plane, etc.) is employed. The communication between the separated control and data planes is accomplished via dedicated communication protocols, such as e.g. Open Flow, ForCES (Forwarding and Control Element Separation protocol), or the like. To this end, an intermediate controller is typically implemented as an inter-plane communication interface, which is configured to control the respective entities on the control plane and the data plane in accordance with the applicable communication protocol, such as e.g. OpenFlow, ForCES (Forwarding and Control Element Separation protocol), or the like.

Referring to 3GPP specifications, network elements such as eNB, RNC, SGSN, GGSN, SGW, PGW, ePDG, BRAS, and TWAN, as well as LSR, may be implemented in a SDN and/or NFV architecture, thus being (logically) decomposed in a control plane entity and a data plane entity with an intermediate inter-plane communication controller (which may be integrated in/with the control plane entity).

However, in SDN and/or NFV architectures, the control plane entity (of any one of such network elements) is typically not able to appropriately handle a signaling message on the data plane, i.e. to generate and send a corresponding outgoing message on the data plane to such incoming signaling message on the data plane.

For example, the GPRS Tunneling Protocol (GTP) defines a user plane protocol part (GTP-U) (in 3GPP TS 29.281), wherein signaling messages are sent via a (GTP-U) tunnel between network elements (also referred to as GTP-U peers) for path management and tunnel management. One of such GTP-U signaling messages is a GTP-U Echo Request, with which a GTP-U peer tries to find out whether the GTP-U peer at the opposite tunnel endpoint is alive, and which has thus to be properly responded by the GTP-U peer at the opposite tunnel endpoint by a GTP-U Echo Response so as to facilitate an appropriate path/tunnel management. However, if a network elements representing a GTP-U tunnel endpoint, i.e. a GTP-U peer, is implemented in a SDN architecture with decomposed control and user plane entities, it is not feasible to respond to respond to the GTP-U Echo Request on the user plane, i.e. to generate and send a GTP-U Echo Response on the user plane.

Thus, there is a need to enable handling of signaling messages on the data plane in a software-defined architecture.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising establishing, in a control plane entity, an instruction for reacting to a specific incoming signaling message on the data plane with at least one corresponding outgoing message on the data plane, and providing the established instruction from the control plane entity to a data plane entity for instructing the data plane entity to react to the specific incoming signaling message with the at least one corresponding outgoing message in accordance with the established instruction.

According to an example aspect of the present invention, there is provided a method comprising obtaining, in a data plane entity, an instruction for reacting to a specific incoming signaling message on the data plane with at least one corresponding outgoing message on the data plane, building, in the data plane entity, upon detection of the specific incoming signaling message on the data plane, the at least one corresponding outgoing message on the data plane in accordance with the obtained instruction, and issuing the at least one corresponding outgoing message on the data plane as a reaction to the specific incoming signaling message.

According to an example aspect of the present invention, there is provided an apparatus comprising a processor, and a memory configured to store computer program code, wherein the processor is configured to cause the apparatus to perform: establishing, in a control plane entity, an instruction for reacting to a specific incoming signaling message on the data plane with at least one corresponding outgoing message on the data plane, and providing the established instruction from the control plane entity to a data plane entity for instructing the data plane entity to react to the specific incoming signaling message with the at least one corresponding outgoing message in accordance with the established instruction.

According to an example aspect of the present invention, there is provided an apparatus comprising a processor, and a memory configured to store computer program code, wherein the processor is configured to cause the apparatus to perform: obtaining, in a data plane entity, an instruction for reacting to a specific incoming signaling message on the data plane with at least one corresponding outgoing message on the data plane, building, in the data plane entity, upon detection of the specific incoming signaling message on the data plane, the at least one corresponding outgoing message on the data plane in accordance with the obtained instruction, and issuing the at least one corresponding outgoing message on the data plane as a reaction to the specific incoming signaling message.

According to an example aspect of the present invention, there is provided an apparatus comprising means for establishing, in a control plane entity, an instruction for reacting to a specific incoming signaling message on the data plane with at least one corresponding outgoing message on the data plane, and means for providing the established instruction from the control plane entity to a data plane entity for instructing the data plane entity to react to the specific incoming signaling message with the at least one corresponding outgoing message in accordance with the established instruction.

According to an example aspect of the present invention, there is provided an apparatus comprising means for obtaining, in a data plane entity, an instruction for reacting to a specific incoming signaling message on the data plane with at least one corresponding outgoing message on the data plane, means for building, in the data plane entity, upon detection of the specific incoming signaling message on the data plane, the at least one corresponding outgoing message on the data plane in accordance with the obtained instruction, and means for issuing the at least one corresponding outgoing message on the data plane as a reaction to the specific incoming signaling message.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, handling of signaling messages on the data plane in a software-defined architecture is enabled. Stated in other words, it is enabled in a virtual software-based architecture with decomposed control plane and data plane entities that a corresponding outgoing message for a specific incoming signaling message on the data plane is generated and sent on the data plane.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
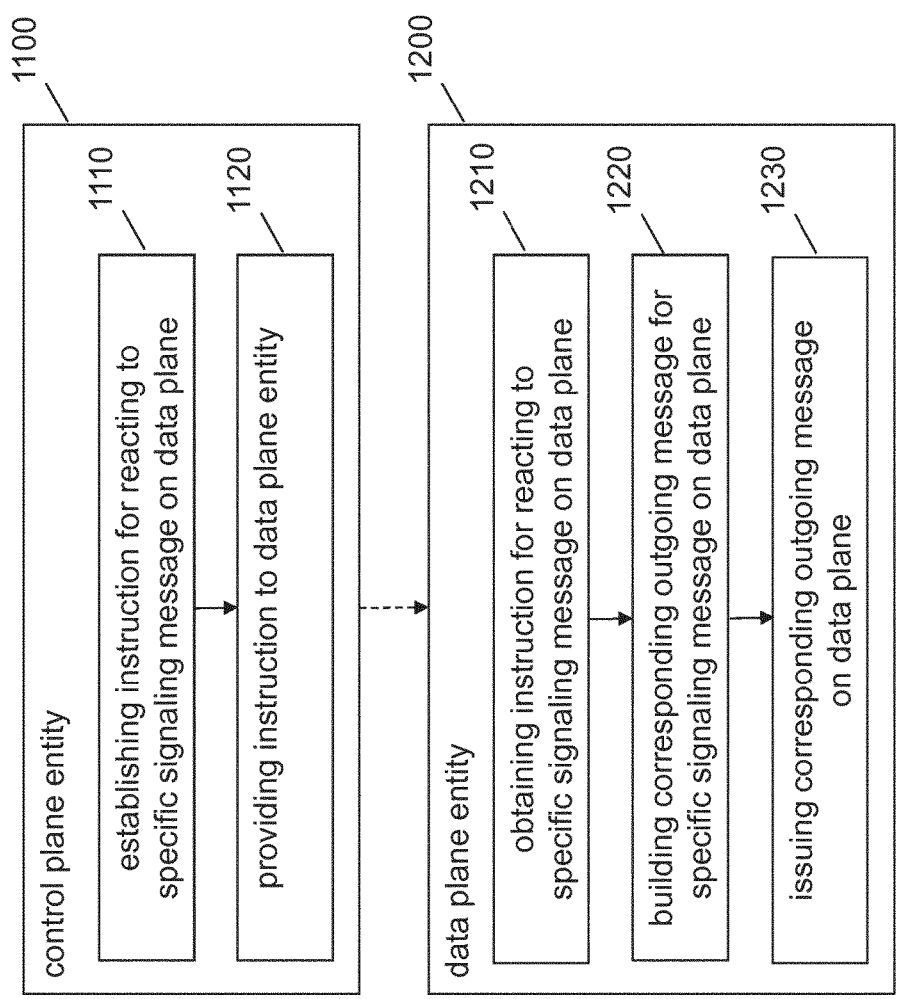
FIG. 1 shows a schematic diagram illustrating a first example of methods at a control plane entity and a data plane entity of a first alternative according to exemplifying embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP and OpenFlow specifications being used as non-limiting examples for certain exemplifying network configurations and deployments. As such, the description of exemplifying embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long exemplifying embodiments described herein are applicable to it.

In particular, the present invention and its embodiments may be applicable in any mobile and/or fixed communication system and/or system deployment supporting SDN and/or NFV architecture, i.e. the implementation of network elements with a separation between control plane and data plane according to a software-defined architecture.

When reference is made herein to a control plane entity and a data plane entity, the term "entity" is to be construed in the broadest possible manner, including any conceivable implementation in terms of physical/hardware-based and/or logical/virtual/software-based elements. Namely, the term "entity" may refer to a software entity (potentially, together with or within its hardware environment) or a function entity (potentially, together with or within its software environment). Similar notions equally apply when reference is made herein to an inter-plane communication controller which is also to be construed in the broadest possible manner, including any conceivable implementation in terms of physical/hardware-based and/or logical/virtual/software-based elements, i.e. as a software entity or a function entity.

To be more specific, any one of a control plane entity, a data plane and an inter-plane communication controller by be implemented in a (pure) SDN architecture, or in a NFV architecture with separated control and data planes according to the SDN principle, or in a combination thereof. In a (pure) SDN architecture, a control plane entity, a data plane and an inter-plane communication controller may be regarded as software entities, which may be realized in a network node or element or the like. In a NFV architecture with separated control and data planes according to the SDN principle, a control plane entity, a data plane and an inter-plane communication controller may be regarded as (virtualized) function entities or functions, which may be realized in a datacenter, central server, or the like.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling to the handling of signaling messages on the data plane in a software-defined architecture.

In general, exemplifying embodiment of the present invention relate to a control plane entity and a data plane entity, which may form a decomposed network elements implemented in (pure) SDN architecture (i.e. as pure control plane and data plane entities) or NFV architecture (i.e. as virtualized control plane and data plane entities) or a combination thereof. The data plane entity may be (part of) a switch or router of a dedicated protocol type (e.g. an OpenFlow switch/router, a ForCES forwarding element, or the like), and the control plane entity may be (part of) a controller of a dedicated protocol type (e.g. an OpenFlow-operable network element controller, a ForCES control element, or the like). An inter-plane communication controller (not shown in FIG. 1) between the control plane entity and the data plane entity may be integrated in/with the control plane entity (thereby exposing the so-called SB (Southbound interface) to the data plane entity), or may be realized as a separate entity in between the control plane entity and the data plane entity (thereby exposing the so-called SB (Southbound interface) to the data plane entity and exposing the so-called NB (Northbound interface) to the control plane entity), or may be integrated in/with the data plane entity (thereby exposing the so-called NB (Northbound interface) to the control plane entity). The inter-plane communication controller may be (part of) an interface of a dedicated protocol type (e.g. an OpenFlow controller, a ForCES network element, or the like).

The control plane entity may be implemented in cloud computing equipment, and may be associated with one or more data plane entities. That is, the control plane entity may be centrally implemented for a single data plane entity, plural data plane entities or all data plane entities in a certain administrative domain. Otherwise, the control plane entity may be implemented in network computing equipment, and may be associated with one data plane entity. That is, the control plane entity may be distributedly implemented for a single data plane entity, i.e. the control plane entity may run on the same network computing equipment as the associated data plane entity.

In the following a first alternative according to exemplifying embodiments of the present invention is described.

FIG. 1 shows a schematic diagram illustrating a first example of methods at a control plane entity and a data plane entity according to exemplifying embodiments of the present invention.

As shown in FIG. 1, a method according to an exemplifying embodiment of the present invention relates to a control plane entity 1100. Such method comprises an operation (1110) of establishing, in the control plane entity, an instruction for reacting to a specific incoming signaling message on the data plane with at least one corresponding outgoing message on the data plane, and an operation (1120) of providing the established instruction from the control plane entity to a data plane entity (as indicated by a dashed arrow) for instructing the data plane entity to react to the specific incoming signaling message with the at least one corresponding outgoing message in accordance with the established instruction.

As shown in FIG. 1, a method according to an exemplifying embodiment of the present invention relates to a data plane entity 1200. Such method comprises an operation (1210) of obtaining, in the data plane entity, an instruction for reacting to a specific incoming signaling message on the data plane with at least one corresponding outgoing message on the data plane, an operation (1220) of building, in the data plane entity, upon detection of the specific incoming signaling message on the data plane, the at least one corresponding outgoing message on the data plane in accordance with the obtained instruction, and an operation (1230) of issuing the at least one corresponding outgoing message on the data plane as a reaction to the specific incoming signaling message.

In the example arrangement of FIG. 1, it is assumed that the control plane entity 1100 provides the reaction instruction to the data plane entity 1200 together with an instruction to store the reaction instruction as a local storage. Accordingly, in the context of obtaining the reaction instruction, the data plane entity 1200 receives the reaction instruction from the control plane entity 1100, e.g. via an inter-plane communication controller, and locally stores the reaction instruction. On the basis of such local approach, any data plane entity, may store a reaction instruction itself and use the locally stored reaction instruction in reacting to the specific incoming signaling message on the data plane. That is, related reaction instructions for the specific incoming signaling message could be stored at any data plane entity (potentially) processing such specific incoming signaling message, e.g. at any GTP-U peer, or at any other entity (i.e. not necessarily a data plane entity).

Such local storage at the data plane entity may be realized in a distributed/separate manner for each incoming port, channel or connection of the data plane entity, or may be realized in a centralized manner for all incoming ports, channels or connections of the data plane entity. In the case of a distributed/separate local storage, the reaction instruction can be stored for the handling of incoming signaling messages of the related specific type, depending on the port, channel or connection, via/from which the incoming signaling messages are received. For example, the reaction instruction can be stored at different storage locations for the handling of all incoming GTP-U Echo Request messages from different GTP peers/tunnels. For example, when the specific incoming signaling message is a GTP-U message such as a GTP-U Echo Request, the private extension information element may be empty or omitted. In the case of a centralized local storage, the reaction instruction can be stored (as sort of template) for the handling of all incoming signaling messages of the related specific type, irrespective of the port, channel or connection, via/from which the incoming signaling messages are received. For example, the reaction instruction can be stored at a single storage location (as a common template) for the handling of all incoming GTP-U Echo Request messages from any GTP peer/tunnel. To this end, in providing the reaction instruction from the control plane entity to the data plane entity (e.g. in an OpenFlow message containing the reaction instruction), a reference to the (central) storage location may be included, where the related reaction instruction is to be stored. So, the data plane entity is able to refer to the central storage (and the thus stored reaction instruction) for the handling of the incoming signaling message of the related specific type.

Figure 2:
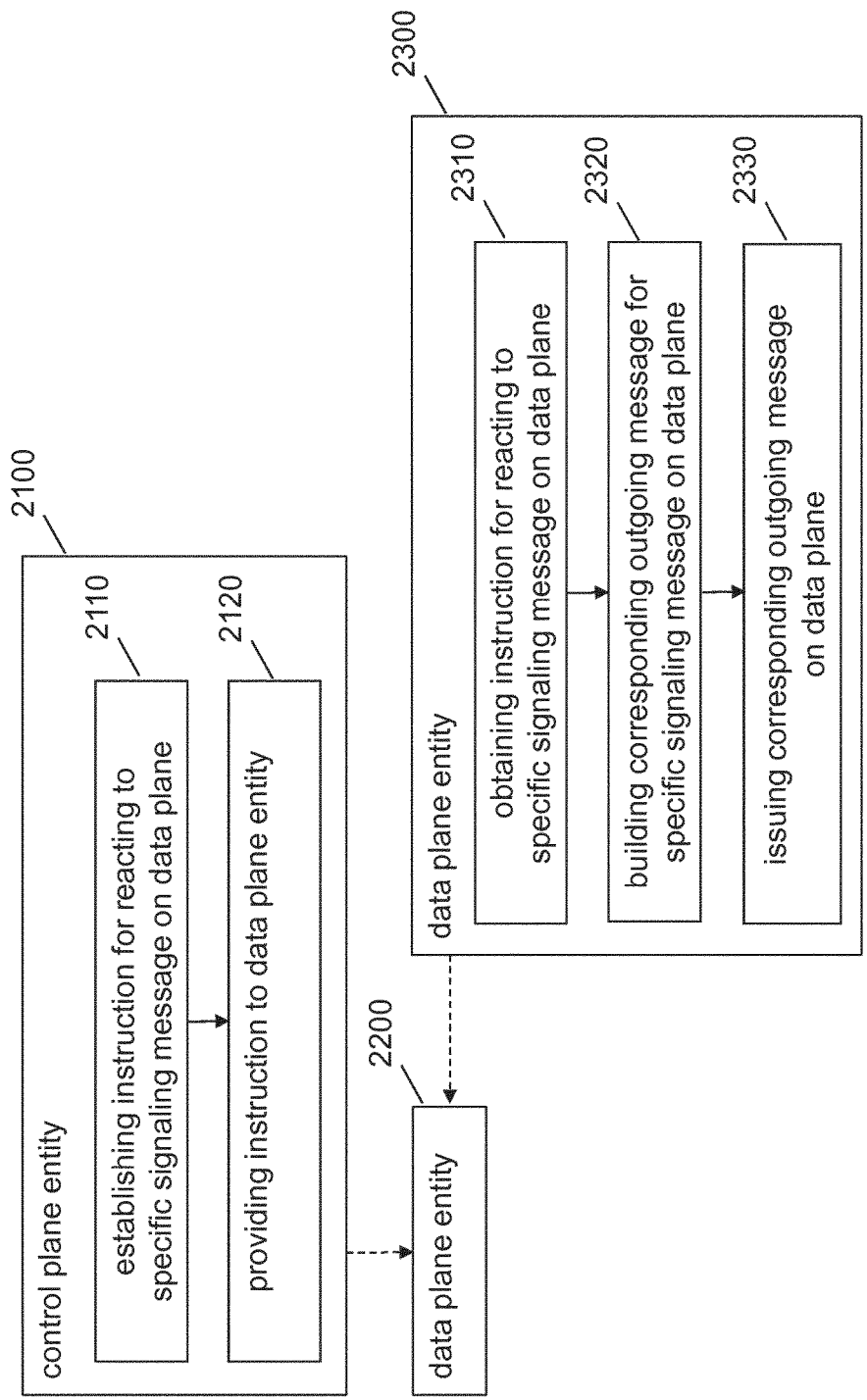
FIG. 2 shows a schematic diagram illustrating a second example of methods at a control plane entity and a data plane entity of the first alternative according to exemplifying embodiments of the present invention.

FIG. 2 shows a schematic diagram illustrating a second example of methods at a control plane entity and a data plane entity according to exemplifying embodiments of the present invention.

As shown in FIG. 2, a method according to an exemplifying embodiment of the present invention relating to a control plane entity 2100 basically corresponds to that relating to the control plane entity 1100 of FIG. 1, and a method according to an exemplifying embodiment of the present invention relating to a data plane entity 2300 basically corresponds to that relating to the data plane entity 1200 of FIG. 1. Specifically, operations 2110 and 2120 of FIG. 2 basically correspond to operations 1110 and 1120 of FIG. 1, and operations 2310 to 2330 of FIG. 2 basically correspond to operations 1210 to 1230 of FIG. 1, respectively. Accordingly, reference is made to the above description of FIG. 1 for details.

In the example arrangement of FIG. 2, it is however assumed that the control plane entity 2100 provides the reaction instruction to an entity such as e.g. a data plane entity 2200, and the other entity such as the data plane entity 2300 obtains the reaction instruction from the data plane entity 2200. Namely, the entity such as the data plane entity 2200 may act as a central storage for the reaction instruction. To this end, the control plane entity 2100 provides the reaction instruction to the entity such as the data plane entity 2200 together with an instruction to store the reaction instruction as a central storage. In the context of obtaining the reaction instruction, the data plane entity 2300 acquires the reaction instruction from the entity such as the data plane entity 2200 acting as a central storage. Such acquisition by accessing the central storage of the reaction instruction may be enabled in that the reaction instruction is uniquely linked with a reference to the central storage thereof. On the basis of such central approach, a single entity such as a single data plane entity in an administrative domain may store a reaction instruction, and (besides a local usage thereof by the storing entity) the stored reaction instruction may be used as a centrally stored reaction instruction in reacting to the specific incoming signaling message on the data plane by any other entity such as any other data plane entities in the administrative domain. For acquiring the reaction instruction from the central storage location, e.g. the data plane entity 2200, the entity processing such specific incoming signaling message, such as a data plane entity, may use an external protocol, like for instance RPC (Remote Procedure Call), a data base interface, or the like.

Namely, the reaction instruction can be stored (as sort of template) for the handling of all incoming signaling messages of the related specific type at a plurality of entities. To this end, in providing the reaction instruction from the control plane entity to the storing entity such as the storing data plane entity (e.g. in an OpenFlow message containing the reaction instruction), a reference to the (central) storage location may be included, where the related reaction instruction is stored. So, any entity is able to refer to the central storage (and the thus stored reaction instruction) for the handling of the incoming signaling message of the related specific type. Thereby, overall storage requirements in the administrative domain and/or the overall system/network can be reduced.

The aforementioned reaction instruction according to exemplifying embodiments of the present invention may be specific for any kind of signaling message on the data plane. Such specific signaling messages may for example comprise one or more of a GTP-U message, a RTCP message, a TCP message, an OSPF message, an IS-IS message, a BFD message, a MPLS message, a MPLS-TP message, a MPLS Generic Associated Channel message (RFC5586), and a RSVP message.

The aforementioned reaction instruction according to exemplifying embodiments of the present invention may refer to responding to the specific incoming signaling message. In this regard, the reaction instruction may comprise an instruction for building the at least one outgoing message as a response message which is responsive to the specific incoming signaling message by transforming the specific incoming signaling message into a corresponding response message. For example, a GTP-U Echo Response message may be built and sent as a reaction to a GTP-U Echo Request Message.

The aforementioned reaction instruction according to exemplifying embodiments of the present invention may (additionally or alternatively) refer to another kind of reaction (other than a (direct) response) to the specific incoming signaling message. In this regard, the reaction instruction may comprise an instruction for building the at least one outgoing message as a dedicated message which is triggered by the specific incoming signaling message by generating the dedicated message in reaction to the specific incoming signaling message. Namely, receipt of a specific incoming signaling message on the data plane may trigger, as a reaction thereto, the building and sending of a dedicated message, alternatively or in addition to a (direct) response message described above. For example, a notification to a monitoring entity may be mentioned, which would like to be informed about a specific event at the data plane entity in question (i.e. an event relating to receipt of a specific incoming signaling message on the data plane).

When referring to a response handling, the aforementioned reaction instruction according to exemplifying embodiments of the present invention may comprise a command set for, and the related building may thus comprise corresponding operations of setting a response message type, and at least one of swapping source and destination addresses, swapping source and destination ports, and generating, modifying or deleting at least one information element or header. The reaction instruction (or, specifically, the command set thereof) may be implemented in various ways. For example, the command set may be listed as atomic commands, i.e. each command may be separately identified/defined, or the command set or a subset thereof may be aggregated in a compound list, i.e. plural commands may be commonly identified/defined. Such compound list may be more efficient in that it may be referenced with a shorter reference as compared with a list of separate commands, thereby enabling to save resources on the control channel between the control plane entity and the data plane entity storing the responding instruction.

Figure 3:
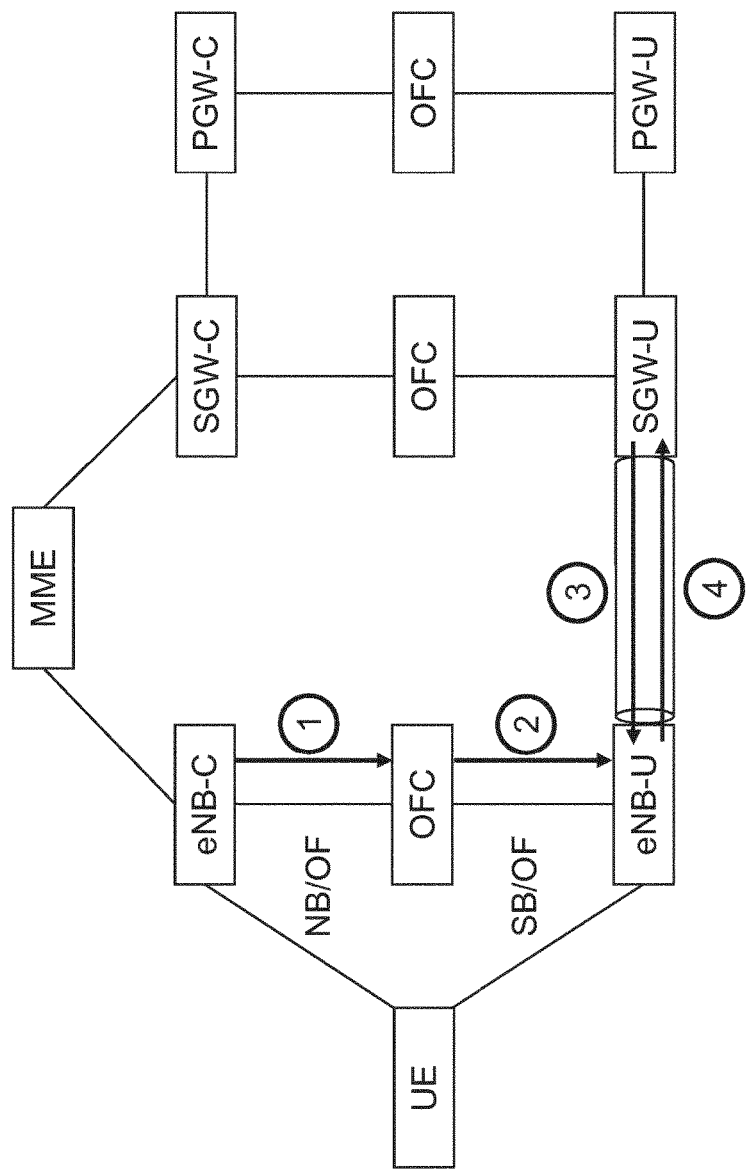
FIG. 3 shows a schematic diagram illustrating an example of a procedure in a system arrangement in a SDN architecture of the first alternative according to exemplifying embodiments of the present invention.

FIG. 3 shows a schematic diagram illustrating an example of a procedure in a system arrangement in a SDN architecture according to exemplifying embodiments of the present invention.

As shown in FIG. 3, the underlying system arrangement exemplarily comprises 3GPP network elements eNB, SGW and PGW, which are implemented in a SDN architecture, with OpenFlow being used as the inter-plane communication protocol. Accordingly, any one the network elements eNB, SGW and PGW is decomposed in a control plane entity (eNB-C, SGW-C and PGW-C) and a data/user plane entity (eNB-U, SGW-U and PGW-U) with an intermediate inter-plane communication controller according to the OpenFlow protocol (OFC). Similarly, other network elements could also be applied in this regard, including e.g. RNC, SGSN, GGSN, ePDG, BRAS, and TWAN. Even if the UE is decomposed in a SDN architecture, it is possible to apply such SDN UE as well.

When implemented in a NFV architecture or a combined SDN/NFV architecture, at least part of the individual entities (i.e. eNB-C, eNB-U, SGW-C, SGW-U, PGW-C, PGW-U, and OFC (for eNB and/or SGW and/or PGW)) would be comprised in at least one datacenter, central server, or the like (instead of in the corresponding network nodes or elements).

While the OpenFlow controller is exemplified as a separate entity between the control plane entity and the data plane entity for each of the illustrated network elements, it could equally be integrated in/with the respective control plane entity or the respective data plane entity, as mentioned above. In the present example, any communication between the respective control plane entities, inter-plane communication controllers and data plane entities is based on the OpenFlow protocol. Depending on the implementation of the OpenFlow controller in the respective control plane entity or the respective data plane entity, any such communication may be carried via the so-called SB interface or the so-called NB interface, as indicated in FIG. 3.

In the following description, it is exemplarily assumed that a GTP-U Echo Request, which is sent from the SGW to the eNB via a GTP-U tunnel, represents a specific signaling message which is to be responded by the eNB. Such example is for illustrative purposes only and does not limit the present invention. Specifically, any other signaling message on the data/user plane may be similarly processed at any one of the illustrated network elements.

In a first step, the eNB-C establishes an instruction for responding (as a non-limiting example of reacting) to the GTP-U Echo Request and provides the same to the OFC. In a second step, the OFC forwards the instruction to the eNB-U.

In the presently illustrated context of OpenFlow, the instruction may comprise a matching rule for matching the specific signaling message (the GTP-U Echo Request in the present example) with an added or modified flow entry in a flow table of the data plane entity and an action set, associated with the matching flow entry, for defining one or more commands for transforming the specific signaling message (the GTP-U Echo Request in the present example) into the corresponding response message (the GTP-U Echo Response in the present example). Accordingly, the instruction may be provided in the form of a flow modification instruction (MOD-FLOW) or a flow addition instruction (ADD-FLOW) for the GTP-U tunnel in question via the OFC to the eNB-U. In such instruction, specific commands for certain actions to be applied to the GTP-U Echo Request are identified/defined, as exemplified below.

In a third step, the eNB-U receives the GTP-U Echo Request via the GTP-U tunnel from the SGW, i.e. detects receipt thereof, and builds a response by transforming the GTP-U Echo Request into a GTP-U Echo Response in accordance with the instruction from the eNB-C. In a fourth step, the eNB-U issues the GTP-U Echo Response on the data plane via the GTP-U tunnel to the SGW as a reaction to the GTP-U Echo Request.

The instruction for transforming the GTP-U Echo Request into a GTP-U Echo Response may comprise a command set for, and the related transforming may thus comprise corresponding operations of replacing a request message type with a response message type, and at least one of swapping source and destination internet protocol addresses, swapping source and destination internet protocol ports, swapping source and destination user datagram protocol ports, replacing a tunnel endpoint identifier, adding or replacing a private extension information element, and pushing a recovery information element.

The layout of the GTP-U Echo Request is as follows:
Private Extension [optional]
GTP-U header (includes message type, TEID, Sequence Number, N-PDU number)
UDP
IP The layout of the GTP-U Echo Response is as follows:
Private Extension [optional]
Recovery
GTP-U header (includes MSG Type, TEID, Sequence Number, N-PDU number)
UDP
IP The private extension information element contains an extension identifier and an extension value for representing vendor-specific information. The private extension information element is an optional information element that may be included in any GTP signaling message, wherein a GTP signaling message may include more than one information element of the private extension type.

The recovery information element contains a restart counter which is always set to 0.

In view of the above-outlined message layouts, the following actions/commands can be included in the instruction for transforming the GTP-U Echo Request into a GTP-U Echo Response.

| Action/Command | Description |
| --- | --- |
| Swap IP address | Mutually exchange/swap the contents of source and destination IP addresses |
| Swap IP port | Mutually exchange/swap the contents of source and destination IP ports |
| Swap UDP port | Mutually exchange/swap the contents of source and destination UDP ports |
| Set Message type | Replace the existing message type |
| Set TEID | Replace the existing TEID (perform recursive hash) |
| Set Private Extension | Replace the existing information element "Private Extension" |
| Push Recovery | Push a new information element "Recovery" |

Such actions/commands may be associated with the matching rule for the receipt of the GTP-U Echo Request so as to be executed on the received GTP-U Echo Request upon matching the same to the corresponding flow entry, i.e. the associated actions/commands are evaluated on the basis of the received GTP-U Echo Request by the eNB-U. Afterwards, the thus transformed GTP-U Echo Response is sent out via the output port associated with the originating IP address and port.

Consequently, instead of forwarding the GTP-U Echo Request from the eNB-U to the OFC, the eNB-U keeps the GTP-U Echo Request within its realm, according to the requirement of the commands/actions as associated with the matching rule of the GTP-U Echo Request, in order to manipulate the received message such that it is rewritten to be a GTP-U Echo Response.

In an OpenFlow based system arrangement, exemplifying embodiments of the present invention encompass the following procedures. On the one hand, an action/indication regarding the instruction is added at least to the ADD-FLOW or MOD-FLOW message. On the other hand, the data plane entity advertises its capability be able to apply the new set of commands/actions according to the instruction in a Features Reply message in response to a Features Request message towards the OFC during a handshake procedure for establishing the OpenFlow channel.

As evident from the above, the GTP-U Echo procedure according to 3GPP specifications is fully supported by the first alternative according to exemplifying embodiments of the present invention.

The first alternative according to exemplifying embodiments of the present invention enables that a corresponding outgoing message on the data plane is built as a reaction to a specific signaling message on the data plane. In this regard, the data plane entity (and/or, if integrated, the inter-plane communication controller) evaluates (and potentially modifies) the specific signaling message on the data/forwarding plane level only, and issues the resulting outgoing message on the data plane.

As compared with a second alternative to be described below, the first alternative according to exemplifying embodiments of the present invention exhibits various advantages. Basically, it is beneficial that the control plane entity (the eNB-C in the above example and/or, if integrated, the inter-plane communication controller) and/or the corresponding inter-plane communication controller is not required to receive or process the specific incoming signaling message (the GTP-U Echo Request in the above example) and to create the corresponding outgoing message (the GTP-U Echo Response in the above example). Furthermore, computation load is lower, which burdens the control plane entity (the eNB-C in the above example and/or, if integrated, the inter-plane communication controller), the inter-plane communication interface, and the data plane entity (the eNB-U in the above example and/or, if integrated, the inter-plane communication controller). Hence, potentially heavy loads in these entities may be prevented. This results in the possibility of having more connections such as GTP tunnels between corresponding network elements or peer, which can be handled simultaneously. This is more efficient in terms of resource usage. That is, the first alternative according to exemplifying embodiments of the present invention relieves the control plane entity (the eNB-C in the above example and/or, if integrated, the inter-plane communication controller) and the inter-plane communication controller (the OFC in the above example) from additional load and minimizes the traffic load on the inter-plane communication interfaces between them.

In the following a second alternative according to exemplifying embodiments of the present invention is described.

Figure 4:
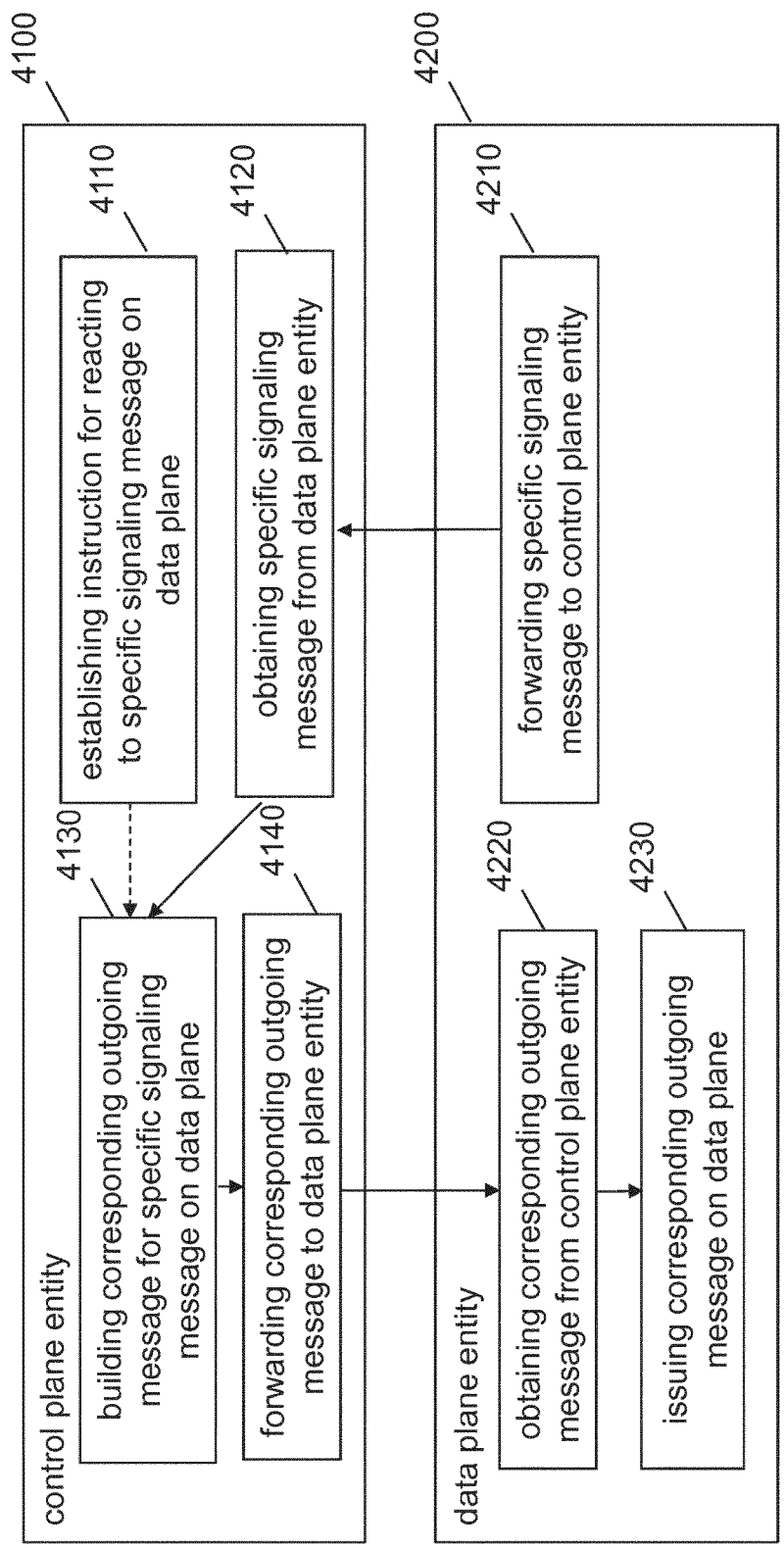
FIG. 4 shows a schematic diagram illustrating an example of methods at a control plane entity and a data plane entity of a second alternative according to exemplifying embodiments of the present invention.

FIG. 4 shows a schematic diagram illustrating an example of methods at a control plane entity and a data plane entity according to exemplifying embodiments of the present invention.

As shown in FIG. 4, a method according to an exemplifying embodiment of the present invention relates to a data plane entity 4200. Such method comprises an operation (4210) of forwarding a specific incoming signaling message, upon detection of the specific incoming signaling message on the data plane, to a control data entity 4100, an operation (4220) of obtaining at least one corresponding outgoing message to the specific incoming signaling message from the control plane entity 4100, and an operation (4230) of issuing the at least one corresponding outgoing message on the data plane as a reaction to the specific incoming signaling message.

As shown in FIG. 4, a method according to an exemplifying embodiment of the present invention relates to a control plane entity 4100. Such method comprises an operation (4110) of establishing an instruction for reacting to a specific incoming signaling message on the data plane with at least one corresponding outgoing message on the data plane, an operation (4120) of obtaining the specific incoming signaling message from the data plane entity 4200, an operation (4130) of building the at least one corresponding outgoing message on the data plane in accordance with the established instruction, and an operation (4140) of forwarding the at least one corresponding outgoing message for the specific incoming signaling message to the data plane entity 4200.

The aforementioned instruction according to exemplifying embodiments of the present invention may be specific for any kind of signaling message on the data plane. Such specific signaling messages may for example comprise one or more of a GTP-U message, a RTCP message, a TCP message, an OSPF message, an IS-IS message, a BFD message, a MPLS message, a MPLS-TP message, a MPLS Generic Associated Channel message (RFC5586), and a RSVP message.

As explained above, the aforementioned reaction instruction according to exemplifying embodiments of the present invention may refer to responding to the specific incoming signaling message and/or to another kind of reaction (other than a (direct) response) to the specific incoming signaling message. Namely, the reaction instruction may comprise an instruction for building the at least one outgoing message as a response message which is responsive to the specific incoming signaling message by transforming the specific incoming signaling message into a corresponding response message and/or an instruction for building the at least one outgoing message as a dedicated message which is triggered by the specific incoming signaling message by generating the dedicated message in reaction to the specific incoming signaling message.

When referring to a response handling, the aforementioned reaction instruction according to exemplifying embodiments of the present invention may comprise a command set for, and the related building may thus comprise corresponding operations, as described above in the first alternative. Accordingly, a detailed description in this regard is not repeated, but reference is made to the above for details in this regard. In particular, if the control plane entity is logically and/or physically separated from the inter-plane communication controller utilizing the NB (Northbound) or OF interface, the signal message handling approach of the second alternative is specifically applicable.

Figure 5:
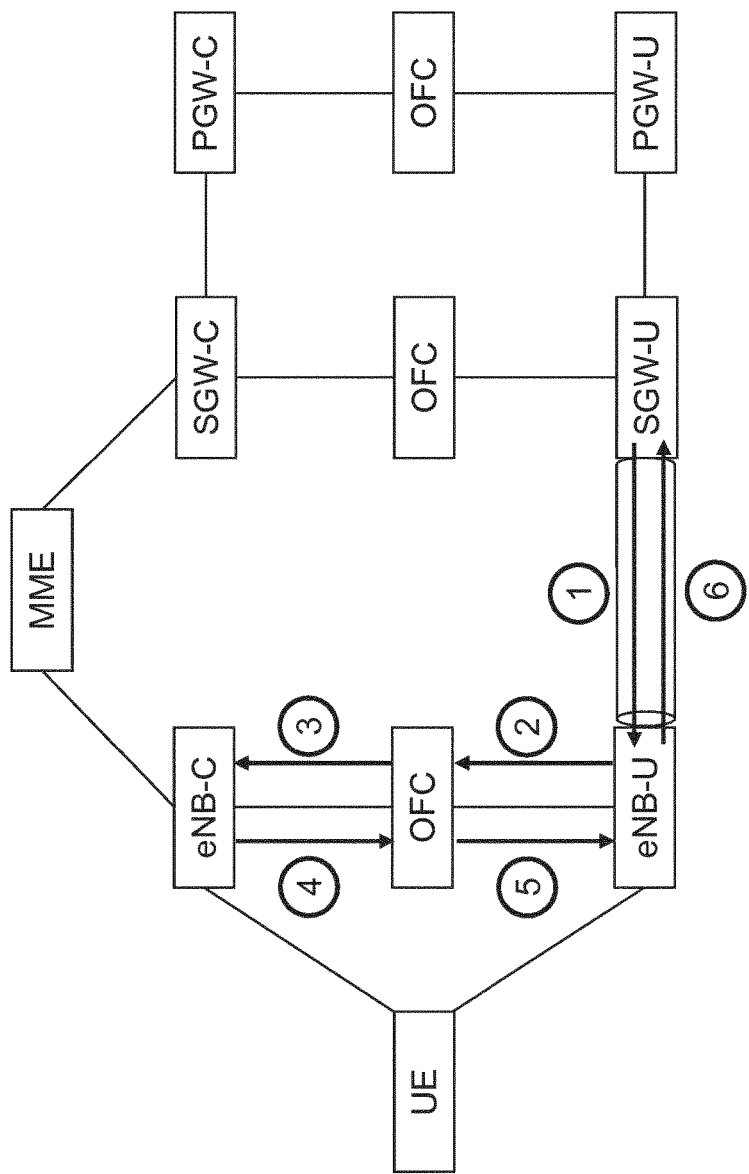
FIG. 5 shows a schematic diagram illustrating an example of a procedure in a system arrangement in a SDN architecture of the second alternative according to exemplifying embodiments of the present invention.

FIG. 5 shows a schematic diagram illustrating an example of a procedure in a system arrangement in a SDN architecture according to exemplifying embodiments of the present invention.

As shown in FIG. 5, the underlying system arrangement is corresponds to that of FIG. 3. Namely, 3GPP network elements eNB, SGW and PGW, are exemplified, which are implemented in a SDN architecture, with OpenFlow being used as the inter-plane communication protocol. Further, responding to a GTP-U Echo Request is exemplified for illustrative purposes only. For further details in this regard, reference is made to the description of FIG. 3. The above notions regarding an implementation in a NFV architecture or a combined SDN/NFV architecture also apply in equal measure.

In a first step, the eNB-U receives a GTP-U Echo Request via the GTP-U tunnel from the SGW, i.e. detects receipt thereof. In a second step, the eNB-U forwards the received GTP-U Echo Request to the OFC via an OpenFlow "Packet In" message. In a third step, the OFC forwards the received GTP-U Echo Request to the eNB-C via an OpenFlow "Packet In" message. Then, the eNB-C evaluates the GTP-U Echo Request, as carried in the OpenFlow "Packet In" message and transforms the same into a GTP-U Echo Response in accordance with the related instruction for responding (as a non-limiting example of reacting) to the GTP-U Echo Request. In a fourth step, the eNB-C forwards the built GTP-U Echo Response to the OFC via an OpenFlow "Packet Out" message. In a fifth step, the OFC forwards the received GTP-U Echo Response to the eNB-U via an OpenFlow "Packet Out" message. In a sixth step, the eNB-U issues the GTP-U Echo Response on the data plane via the GTP-U tunnel to the SGW.

The instruction for transforming the GTP-U Echo Request into a GTP-U Echo Response may comprise a command set for, and the related transforming may thus comprise corresponding operations, as described above in connection with FIG. 3. Accordingly, a detailed description in this regard is not repeated, but reference is made to the description of FIG. 3 for details in this regard.

Consequently, the GTP-U Echo Request is forwarded from the eNB-U to the OFC and further to the eNB-C, and the eNB-C evaluates the GTP-U Echo Request within its realm, according to the requirement of the commands/actions as associated with the GTP-U Echo Request, in order to manipulate the received message such that it is rewritten to be a GTP-U Echo Response.

Anyway, the eNB-U may be configured with a matching rule for matching the specific signaling message (the GTP-U Echo Request in the present example) with an added or modified flow entry in a flow table of the data plane entity so as to enable uniquely matching the specific signaling message (the GTP-U Echo Request in the present example) with the corresponding outgoing message (the GTP-U Echo Response in the present example). Accordingly, an instruction associated with the reaction instruction may be provided from the eNB-C to the eNB-U (similar as in the first alternative) in the form of a flow modification instruction (MOD-Flow) or a flow addition instruction (ADD-Flow) for the GTP-U tunnel in question via the OFC.

As evident from the above, the GTP-U Echo procedure according to 3GPP specifications is fully supported by the second alternative according to exemplifying embodiments of the present invention.

The second alternative according to exemplifying embodiments of the present invention enables that a corresponding outgoing message on the data plane is built as a reaction to a specific incoming signaling message on the data plane. In this regard, the data plane entity (and/or, if integrated, the inter-plane communication controller) forwards the specific incoming signaling message for generation of a reaction thereto to the control plane entity (and/or, if integrated, the inter-plane communication controller), and the control plane entity (and/or, if integrated, the inter-plane communication controller) evaluates (and potentially) modifies the specific incoming signaling message on the control plane level only, and forwards the resulting outgoing message to the data plane entity for issuance on the data plane.

In the following a third alternative according to exemplifying embodiments of the present invention is described.

Although not shown, the individual operations of methods at a control plane entity and a data plane entity according to exemplifying embodiments of the present invention are basically similar to that in the second alternative, as described above.

Figure 6:
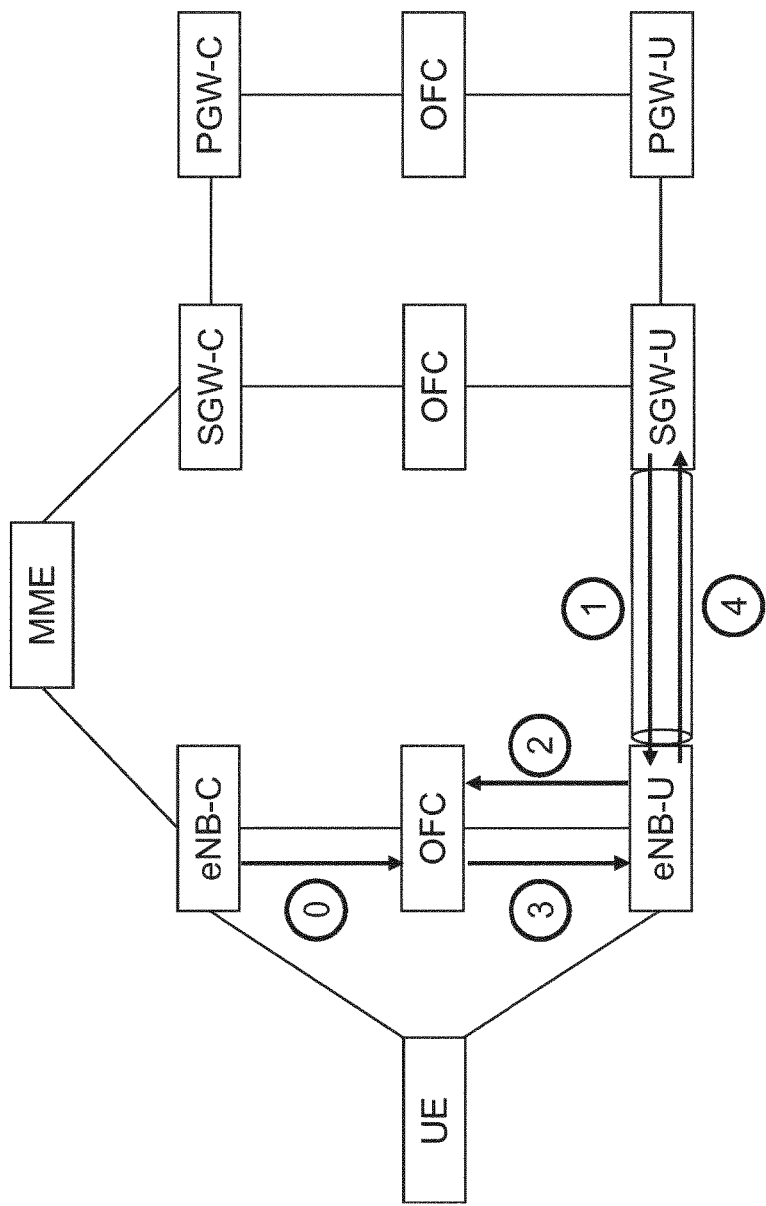
FIG. 6 shows a schematic diagram illustrating an example of a procedure in a system arrangement in a SDN architecture of a third alternative according to exemplifying embodiments of the present invention.

Namely, the operation 4110 of FIG. 4 (as well as a provision similar to that of the operation 1120 of FIG. 1) may be realized in the control plane entity, the operations 4120, 4130 and 4140 of FIG. 4 may be realized in an inter-plane communication controller, and the operations 4210, 4220 and 4230 of FIG. 4 may be realized in the data plane entity FIG. 6 shows a schematic diagram illustrating an example of a procedure in a system arrangement in a SDN architecture of a third alternative according to exemplifying embodiments of the present invention.

As shown in FIG. 6, the underlying system arrangement is corresponds to that of FIGS. 3 and 5. Namely, 3GPP network elements eNB, SGW and PGW, are exemplified, which are implemented in a SDN architecture, with OpenFlow being used as the inter-plane communication protocol. Further, responding to a GTP-U Echo Request is exemplified for illustrative purposes only. For further details in this regard, reference is made to the description of FIG. 3. The above notions regarding an implementation in a NFV architecture or a combined SDN/NFV architecture also apply in equal measure.

In a preliminary step (denoted as step 0), the eNB-C instructs the OFC to act on behalf of the eNB-C in terms of the handling of a specific incoming signaling message on the data plane. Such instructions could comprise the provision of an instruction for reacting to the specific incoming signaling message, as explained in detail above.

In a first step, the eNB-U receives a GTP-U Echo Request via the GTP-U tunnel from the SGW, i.e. detects receipt thereof. In a second step, the eNB-U forwards the received GTP-U Echo Request to the OFC via an OpenFlow "Packet In" message. Then, according to the instruction from the eNB-C, the OFC evaluates the GTP-U Echo Request, as carried in the OpenFlow "Packet In" message and transforms the same into a GTP-U Echo Response in accordance with the related instruction for responding (as a non-limiting example of reacting) to the GTP-U Echo Request. In a third step, the OFC forwards the built GTP-U Echo Response to the eNB-U via an OpenFlow "Packet Out" message. In a fourth step, the eNB-U issues the GTP-U Echo Response on the data plane via the GTP-U tunnel to the SGW.

The instruction for transforming the GTP-U Echo Request into a GTP-U Echo Response may comprise a command set for, and the related transforming may thus comprise corresponding operations, as described above in connection with FIGS. 3 and 5. Accordingly, a detailed description in this regard is not repeated, but reference is made to the description of FIG. 3 for details in this regard.

Consequently, the GTP-U Echo Request is forwarded from the eNB-U to the OFC, and the OFC evaluates the GTP-U Echo Request within its realm, according to the requirement of the commands/actions as associated with the GTP-U Echo Request, in order to manipulate the received message such that it is rewritten to be a GTP-U Echo Response.

As evident from the above, the GTP-U Echo procedure according to 3GPP specifications is fully supported by the third alternative according to exemplifying embodiments of the present invention.

The third alternative according to exemplifying embodiments of the present invention could be regarded as a hybrid solution on the basis of the first and second alternatives, as described above. It enables that a corresponding outgoing message on the data plane is built as a reaction to a specific incoming signaling message on the data plane. In this regard, the data plane entity forwards the specific incoming signaling message for generation of a reaction thereto to an inter-plane communication controller, and the inter-plane communication controller evaluates (and potentially) modifies the specific incoming signaling message, and forwards the resulting outgoing message to the data plane entity for issuance on the data plane. Depending on the implementation of the OpenFlow controller in the respective control plane entity or the respective data plane entity, the evaluation of the specific incoming signaling message takes place on the control plane level only or on the data/forwarding plane level only.

By virtue of exemplifying embodiments of the present invention, as evident from the above, handling of signaling messages on the data plane in a software-defined architecture is enabled. Stated in other words, it is enabled in a software-defined architecture (such as a SDN and/or NFV architecture) with decomposed control plane and data plane entities that a corresponding outgoing message for a specific incoming signaling message on the data plane is generated and sent on the data plane. In this regard, various ways are described for building an appropriate outgoing message for a received signaling message on the data plane.

While the foregoing description focuses on certain examples of signaling messages, it is to be noted that exemplifying embodiments of the present invention are equally applicable to any kind of signaling message carried on the data plane. For example, the specific signaling message according to exemplifying embodiments of the present invention may be any GTP-U message which might be received and to which a corresponding outgoing message such as e.g. a response is to be built and sent. Generally speaking, the mechanism according to exemplifying embodiments of the present invention may be applicable to any messages of any kind of protocols which are (logically/virtually) close to the data/user/forwarding plane, like e.g. RTCP, TCP, or the like. In principle, for instance even OSPF messages, IS-IS messages, BFD MPLS messages, MPLS-TP messages, MPLS Generic Associated Channel messages (RFC5586) and/or RSVP keep alive responses, signaling errors or the like may be built and sent in accordance with the mechanism according to exemplifying embodiments of the present invention.

While the foregoing description focuses on certain examples of SDN architectures on the basis of the OpenFlow protocol, it is to be noted that exemplifying embodiments of the present invention are equally applicable to any kind of (inter-plane) communication protocol which is appropriate for being adopted in SDN and/or NFV architectures. For example, the (inter-plane) communication protocol according to exemplifying embodiments of the present invention may be any communication protocol capable of defining and controlling an inter-plane communication interface between a control plane entity and a data plane entity (e.g. of certain network elements). Such (inter-plane) communication protocol exemplarily comprises ForCES, SNMP, or NetConf.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and systems, including both software and/or hardware thereof.

Respective exemplifying embodiments of the present invention are described below referring to FIG. 7, while for the sake of brevity reference is made to the detailed description of respective corresponding configurations/setups, schemes, methods and functionality, principles and operations according to FIGS. 1 to 6.

Figure 7:
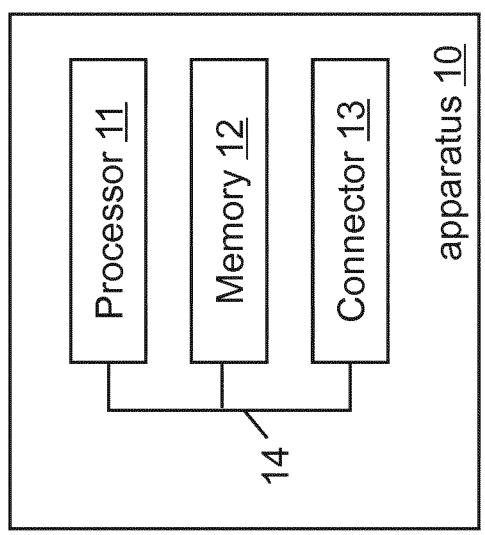
FIG. 7 shows a schematic diagram illustrating an example of a structure of apparatuses according to exemplifying embodiments of the present invention.

FIG. 7 shows a schematic diagram illustrating an example of a structure of apparatuses according to exemplifying embodiments of the present invention.

In FIG. 7, the solid line blocks are basically configured to perform respective methods, procedures and/or functions as described above. The entirety of solid line blocks are basically configured to perform the methods, procedures and/or functions as described above, respectively. With respect to FIG. 7, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 7, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

As indicated in FIG. 7, according to exemplifying embodiments of the present invention, an apparatus 10 may comprise at least one processor 11 and at least one memory 12 (and possibly also at least one connector 13), which may be operationally connected or coupled, for example by a bus 14 or the like, respectively. The apparatus 10 may be (part of) cloud computing equipment or network computing equipment.

The processor 11 and/or the connector 13 of the apparatus 10 may also include a modem or the like to facilitate communication over a (hardwire or wireless) link, respectively. The connector 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The connector 13 of the apparatus 10 is generally configured to communicate with at least one other apparatus, device, node or entity (in particular, the connector thereof).

The memory 12 of the apparatus 10 may store respective programs, program products, macros or applets, etc. or parts of them, which may be assumed to comprise program instructions or computer program code that, when executed by the respective processor, enables the respective electronic device or apparatus to operate in accordance with exemplifying embodiments of the present invention.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

The thus illustrated apparatus 10 may represent a (part of a) control plane entity and/or an (integrated/associated) inter-plane communication controller according to exemplifying embodiments of the present invention, and it may be configured to perform (or carry out, execute, etc.) a procedure and/or exhibit a functionality as described (for the control plane entity (e.g. of an arbitrary network element)) in any one of FIGS. 1 to 6, especially any one of FIGS. 1 to 3.

In this case, the apparatus 10 or its processor 11 (possibly together with computer program code stored in the memory 12), in its most basic form, is configured to establish, in a control plane entity, an instruction for reacting to a specific incoming signaling message on the data plane with at least one corresponding outgoing message on the data plane, and provide the established instruction from the control plane entity to a data plane entity for instructing the data plane entity to react to the specific incoming signaling message with the at least one corresponding outgoing message in accordance with the established instruction.

As an alternative, the apparatus 10 or its processor 11 (possibly together with computer program code stored in the memory 12) may be configured to provide the established instruction to an inter-plane communication controller instead of the data plane entity.

The thus illustrated apparatus 10 may represent a (part of a) data plane entity and/or an (integrated/associated) inter-plane communication controller according to exemplifying embodiments of the present invention, and it may be configured to perform (or carry out, execute, etc.) a procedure and/or exhibit a functionality as described (for the data plane entity (e.g. of an arbitrary network element)) in any one of FIGS. 1 to 6, especially any one of FIGS. 1 to 3.

In this case, the apparatus 10 or its processor 11 (possibly together with computer program code stored in the memory 12), in its most basic form, is configured to obtain, in a data plane entity, an instruction for reacting to a specific incoming signaling message on the data plane with at least one corresponding outgoing message on the data plane, build, in the data plane entity, upon detection of the specific incoming signaling message on the data plane, the at least one corresponding outgoing message on the data plane in accordance with the obtained instruction, and issue the at least one corresponding outgoing message on the data plane as a reaction to the specific incoming signaling message.

As an alternative, the apparatus 10 or its processor 11 (possibly together with computer program code stored in the memory 12) may be configured to act as an inter-plane communication controller arranged in between the data plane and the control plane such that the instruction is obtained in the-plane communication controller instead of the data plane entity, and the at least one corresponding outgoing message is build in the inter-plane communication controller instead of the data plane entity. Then, the inter-plane communication controller may issue the thus built at least one corresponding outgoing message to the data plane entity instead of to the data plane (tunnel, channel, connection, etc.) as such.

According to exemplifying embodiments of the present invention, any one of the processor, the memory and the connector may be implemented as individual modules, chips, chipsets, circuitries or the like, or one or more of them can be implemented as a common module, chip, chipset, circuitry or the like, respectively.

As mentioned above, any apparatus according to exemplifying embodiments of the present invention may be structured by comprising respective means for performing corresponding operations, procedures and/or functions. For example, such means may be implemented/realized on the basis of an apparatus structure, as exemplified in FIG. 6 above, i.e. by one or more processors 11, one or more memories 12, one or more connectors 13, or any combination thereof.

Referring to FIGS. 1 and 2, an apparatus according to exemplifying embodiments of the present invention, which relates to a control plane entity, may comprise means for establishing, in a control plane entity, an instruction for reacting to a specific incoming signaling message on the data plane with at least one corresponding outgoing message on the data plane (as indicated by blocks 1110 and 2110), and means for providing the established instruction from the control plane entity to a data plane entity for instructing the data plane entity to react to the specific incoming signaling message with the at least one corresponding outgoing message in accordance with the established instruction (as indicated by blocks 1120 and 2120).

Referring to FIGS. 1 and 2, an apparatus according to exemplifying embodiments of the present invention, which relates to a data plane entity, may comprise means for obtaining, in a data plane entity, an instruction for reacting to a specific incoming signaling message on the data plane with at least one corresponding outgoing message on the data plane (as indicated by blocks 1210 and 2310), means for building, in the data plane entity, upon detection of the specific incoming signaling message on the data plane, the at least one corresponding outgoing message on the data plane in accordance with the obtained instruction (as indicated by blocks 1220 and 2320), and means for issuing the at least one corresponding outgoing message on the data plane in response to the specific incoming signaling message (as indicated by blocks 1230 and 2330).

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for handling a signaling message on a data plane in a software-defined architecture. Such measures may exemplarily comprise establishing, in a control plane entity, an instruction for reacting to a specific incoming signaling message on the data plane with a corresponding outgoing message on the data plane, providing the established instruction from the control plane entity to a data plane entity for instructing the data plane entity to react to the specific incoming signaling message with the corresponding outgoing message in accordance with the established instruction, and reacting, in the data plane entity, upon detection of the specific incoming signaling message on the data plane, to the specific incoming signaling message on the data plane with the corresponding outgoing message on the data plane in accordance with the provided instruction.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
BFD Bi-directional Forwarding Detection
BRAS Broadband Access Server
eNB enhanced NodeB (base station in LTE)
eNB-C enhanced NodeB Control Plane
eNB-U enhanced NodeB User Plane
ePDG evolved Packet Data Gateway
ETSI European Telecommunications Standards Institute
E-UTRAN Evolved Universal Terrestrial Radio Access Network
ForCES Forwarding and Control Element Separation protocol
GGSN Gateway GPRS Support Node
GPRS General Packet Radio Service
GTP GPRS Tunneling Protocol
GTP-U GPRS Tunneling Protocol User Plane
IS-IS Intermediate System to Intermediate System protocol
LSR Label Switched Router
LTE Long Term Evolution
LTE-A Long Term Evolution Advanced
MME Mobility management Entity
MPLS Multi Protocol Label Switching
MPLS-TP MPLS Transport Protocol
NB Northbound NFV Network Functions Virtualization
N-PDU Network Protocol Data Unit
OF Open Flow protocol
OFC Open Flow Controller
OSPF Open Shortest Path First
PGW Packet Gateway
PGW-C Packet Gateway Control Plane
PGW-U Packet Gateway User Plane
RNC Radio Network Controller
RPC Remote Procedure Call
RSVP Resource Reservation Protocol
RTCP Real Time Transport Control Protocol
SB Southbound
SDN Software Defined Networking
SGSN Serving GPRS Support Node
SGW Serving Gateway
SGW-C Serving Gateway Control Plane
SGW-U Serving gateway User Plane
SNMP Simple Network Management Protocol
TCP Transmission Control Protocol
TEID Tunnel Endpoint Identifier
TWAN Trusted WLAN Access Network
UDP User Datagram Protocol
UE User Equipment
WLAN Wireless Local Area Network

The invention claimed is:

1. A method comprising:
    establishing, in a control plane entity, an instruction for reacting to a specific incoming signaling message on a data plane, received via a general packet radio service tunneling protocol user plane (GTP-U) tunnel, with at least one corresponding outgoing message on the data plane, to be issued via the GTP-U tunnel, and
    providing the established instruction from the control plane entity to a data plane entity for instructing the data plane entity to react to the specific incoming signaling message with the at least one corresponding outgoing message in accordance with the established instruction,
    wherein the instruction instructs the data plane entity to build a GTP-U echo response message of response message type, as the at least one corresponding outgoing message, which is a response message responsive to a GTP-U echo request message of request message type, as the specific incoming signaling message, and to issue the GTP-U echo response message on the data plane towards a destination corresponding to a source of the GTP-U echo request message, and
    wherein the instruction comprises a command set for transforming the GTP-U echo request message into the GTP-U echo response message by
    replacing a request message type with a response message type, and
    swapping source and destination internet protocol addresses, swapping source and destination internet protocol ports, swapping source and destination user datagram protocol ports, replacing a tunnel endpoint identifier, adding or replacing a private extension information element, and pushing a recovery information element.

2. The method according to claim 1, wherein
    the instruction is provided via an inter-plane communication controller having an interface in accordance with an OpenFlow, a forwarding and control element separation protocol (ForCES) a simple network management protocol (SNMP), a NetConf, or a network functions virtualisation (NFV protocol, or
    the data plane entity is a switch or router in accordance with an OpenFlow, a ForCES, a SNMP, a NetConf, or a NFV protocol.

3. The method according to claim 1, wherein
    the instruction comprises a matching rule for matching the specific signaling message with an added or modified flow entry in a flow table of the data plane entity and an action set, associated with the matching flow entry, for defining one or more commands for reacting to the specific signaling message.

4. The method according to claim 1, wherein
    the control plane and the data plane are layers of a software defined architecture, or
    the control plane entity and the data plane entity are parts of a network element implemented in a software defined networking architecture or a network functions virtualisation architecture.

5. A method comprising:
    obtaining, in a data plane entity, an instruction for reacting to a specific incoming signaling message on the data plane, received via a general packet radio service tunneling protocol user plane (GTP-U) tunnel, with at least one corresponding outgoing message on the data plane, to be issued via the GTP-U tunnel,
    building, in the data plane entity, upon detection of the specific incoming signaling message on the data plane, the at least one corresponding outgoing message on the data plane in accordance with the obtained instruction, and
    issuing the at least one corresponding outgoing message on the data plane as a reaction to the specific incoming signaling message,
    wherein a GTP-U echo response message of response message type, as the at least one corresponding outgoing message, which is a response message responsive to a GTP-U echo request message of request message type, as the specific incoming signaling message, is built, and the GTP-U echo response message is issued on the data plane towards a destination corresponding to a source of the GTP-U echo request message, and
    wherein the building, based on a command set in the responding instruction, comprises transforming the GTP-U echo request message into the GTP-U echo response message by
    replacing a request message type with a response message type, and
    swapping source and destination internet protocol addresses, swapping source and destination internet protocol ports, swapping source and destination user datagram protocol ports, replacing a tunnel endpoint identifier, adding or replacing a private extension information element, and pushing a recovery information element.

6. The method according to claim 5, wherein
    the instruction is obtained via an inter-plane communication controller having an interface in accordance with an OpenFlow, a forwarding and control element separation protocol (ForCES), a simple network management protocol (SNMP), a NetConf, or a network functions virtualisation (NFV protocol, or
    the data plane entity is a switch or router in accordance with an OpenFlow, a ForCES, a SNMP, a NetConf, or a NFV protocol.

7. The method according to claim 5, wherein
    the instruction comprises a matching rule for matching the specific signaling message with an added or modified flow entry in a flow table of the data plane entity and an action set, associated with the matching flow entry, for defining one or more commands for reacting to the specific signaling message.

8. The method according to claim 5, wherein
the data plane is a layer of a software defined networking architecture, or
the data plane entity is part of a network element implemented in a software defined networking architecture or a network functions virtualisation architecture.

9. An apparatus comprising:
a processor, and
a memory configured to store computer program code,
wherein the processor is configured to cause the apparatus to perform:
establishing, in a control plane entity, an instruction for reacting to a specific incoming signaling message on a data plane, received via a general packet radio service tunneling protocol user plane (GTP-U) tunnel, with at least one corresponding outgoing message on the data plane, to be issued via the GTP-U tunnel, and
providing the established instruction from the control plane entity to a data plane entity for instructing the data plane entity to react to the specific incoming signaling message with the at least one corresponding outgoing message in accordance with the established instruction,
wherein the instruction instructs the data plane entity to build a GTP-U echo response message of response message type, as the at least one corresponding outgoing message, which is a response message responsive to a GTP-U echo request message of request message type, as the specific incoming signaling message, and to issue the GTP-U echo response message on the data plane towards a destination corresponding to a source of the GTP-U echo request message, and
wherein the instruction comprises a command set for transforming the GTP-U echo request message into the GTP-U echo response message by
replacing a request message type with a response message type, and
swapping source and destination internet protocol addresses, swapping source and destination internet protocol ports, swapping source and destination user datagram protocol ports, replacing a tunnel endpoint identifier, and adding or replacing a private extension information element.

10. The apparatus according to claim 9, wherein
the processor is configured to provide the instruction via an inter-plane communication controller having an interface in accordance with an OpenFlow, a forwarding and control element separation protocol (ForCES), a simple network management protocol (SNMP), a NetConf, or a network functions virtualisation (NFV) protocol, or
the data plane entity is a switch or router in accordance with an OpenFlow, a ForCES, a SNMP, a NetConf, or a NFV protocol.

11. The apparatus according to claim 9, wherein
the instruction comprises a matching rule for matching the specific signaling message with an added or modified flow entry in a flow table of the data plane entity and an action set, associated with the matching flow entry, for defining one or more commands for reacting to the specific signaling message.

12. The apparatus according to claim 9, wherein
the control plane and the data plane are layers of a software defined architecture, or
the control plane entity and the data plane entity are parts of a network element implemented in a software defined networking architecture or a network functions virtualisation architecture.

13. The apparatus according to claim 9, wherein
the apparatus is operable as or at a control plane entity of at least one of an enhanced NodeB, a gateway general packet radio service support node, a serving general packet radio service support node, a packet gateway, a serving gateway, an evolved packet data gateway, a trusted wireless local area network access network, a radio network controller, a broadband access server, and a label switched router or
the control plane entity is implemented in cloud computing equipment or network computing equipment.

14. An apparatus comprising:
a processor, and
a memory configured to store computer program code,
wherein the processor is configured to cause the apparatus to perform:
obtaining, in a data plane entity, an instruction for reacting to a specific incoming signaling message on the data plane, received via a general packet radio service tunneling protocol user plane (GTP-U) tunnel, with at least one corresponding outgoing message on the data plane, to be issued via the GTP-U tunnel,
building, in the data plane entity, upon detection of the specific incoming signaling message on the data plane, the at least one corresponding outgoing message on the data plane in accordance with the obtained instruction, and
issuing the at least one corresponding outgoing message on the data plane as a reaction to the specific incoming signaling message,
wherein a GTP-U echo response message of response message type, as the at least one corresponding outgoing message, which is a response message responsive to a GTP-U echo request message of request message type, as the specific incoming signaling message, is built, and the GTP-U echo response message is issued on the data plane towards a destination corresponding to a source of the GTP-U echo request message, and
the processor is configured to cause the apparatus to perform, based on a command set in the responding instruction, transforming the GTP-U echo request message into the GTP-U echo response message by
replacing a request message type with a response message type, and
swapping source and destination internet protocol addresses, swapping source and destination internet protocol ports, swapping source and destination user datagram protocol ports, replacing a tunnel endpoint identifier, and adding or replacing a private extension information element.

15. The apparatus according claim 14, wherein
the processor is configured to obtain the instruction via an inter-plane communication controller having an interface in accordance with an OpenFlow, a forwarding and control element separation protocol (ForCES), a simple network management protocol (SNMP), a NetConf, or a network functions virtualisation (NFV) protocol, or the data plane entity is a switch or router in accordance with an OpenFlow, a ForCES, a SNMP, a NetConf, or a NFV protocol.

16. The apparatus according to claim 14, wherein
the instruction comprises a matching rule for matching the specific signaling message with an added or modified flow entry in a flow table of the data plane entity and an action set, associated with the matching flow entry, for defining one or more commands for reacting to the specific signaling message.

17. The apparatus according to claim 14, wherein
the data plane is a layer of a software defined networking architecture, or
the data plane entity is part of a network element implemented in a software defined networking architecture or a network functions virtualisation architecture.

18. The apparatus according to claim 14, wherein
the apparatus is operable as or at a data plane entity of at least one of an enhanced NodeB, a gateway general packet radio service support node, a serving general packet radio service support node, a packet gateway, a serving gateway, an evolved packet data gateway, a trusted wireless local area network access network, a radio network controller, a broadband access server, and a label switched router or
the data plane entity is implemented in network computing equipment.

19. A non-transitory computer-readable medium storing instructions that, when executed by a processing device, perform at least one of a first method and a second method,
wherein the first method comprises:
establishing, in a control plane entity, an instruction for reacting to a specific incoming signaling message on a data plane, received via a general packet radio service tunneling protocol user plane (GTP-U) tunnel, with at least one corresponding outgoing message on the data plane, to be issued via the GTP-U tunnel, and
providing the established instruction from the control plane entity to a data plane entity for instructing the data plane entity to react to the specific incoming signaling message with the at least one corresponding outgoing message in accordance with the established instruction,
wherein the instruction instructs the data plane entity to build a GTP-U echo response message of response message type, as the at least one corresponding outgoing message, which is a response message responsive to a GTP-U echo request message of request message type, as the specific incoming signaling message, and to issue the GTP-U echo response message on the data plane towards a destination corresponding to a source of the GTP-U echo request message, and
wherein the instruction comprises a command set for transforming the GTP-U echo request message into the GTP-U echo response message by
replacing a request message type with a response message type, and
swapping source and destination internet protocol addresses, swapping source and destination internet protocol ports, swapping source and destination user datagram protocol ports, replacing a tunnel endpoint identifier, adding or replacing a private extension information element, and pushing a recovery information element;
wherein the second method comprises:
obtaining, in a data plane entity, an instruction for reacting to a specific incoming signaling message on the data plane, received via a GTP-U tunnel, with at least one corresponding outgoing message on the data plane, to be issued via the GTP-U tunnel,
building, in the data plane entity, upon detection of the specific incoming signaling message on the data plane, the at least one corresponding outgoing message on the data plane in accordance with the obtained instruction, and
issuing the at least one corresponding outgoing message on the data plane as a reaction to the specific incoming signaling message,
wherein a GTP-U echo response message of response message type, as the at least one corresponding outgoing message, which is a response message responsive to a GTP-U echo request message of request message type, as the specific incoming signaling message, is built, and the GTP-U echo response message is issued on the data plane towards a destination corresponding to a source of the GTP-U echo request message, and
wherein the building, based on a command set in the responding instruction, comprises transforming the GTP-U echo request message into the GTP-U echo response message by
replacing a request message type with a response message type, and
swapping source and destination internet protocol addresses, swapping source and destination internet protocol ports, swapping source and destination user datagram protocol ports, replacing a tunnel endpoint identifier, adding or replacing a private extension information element, and pushing a recovery information element.

* * * * *